United States Patent [19]

Ianna et al.

[11] Patent Number: 5,161,250
[45] Date of Patent: Nov. 3, 1992

[54] SINGLE USE RADIO DEVICE AND METHOD FOR USING THE SAME

[75] Inventors: Joseph T. Ianna, Audubon; John C. Deshong, Manheim, both of Pa.

[73] Assignee: Play Action Inc., Audubon, Pa.

[21] Appl. No.: 508,646

[22] Filed: Apr. 12, 1990

[51] Int. Cl.⁵ .......................... H04B 7/00; H04B 1/16
[52] U.S. Cl. ...................... 455/66; 455/344; 455/347
[58] Field of Search ........... 455/39, 41, 49, 66, 455/67, 100, 346-349, 344, 343; 381/92, 81, 155; 340/522, 573

[56] References Cited

U.S. PATENT DOCUMENTS

| | | | |
|---|---|---|---|
| 2,710,345 | 6/1955 | Stephens | 455/100 |
| 3,790,948 | 2/1974 | Ratkovich | 455/66 |
| 3,921,621 | 11/1975 | Baessler | 340/870.24 |
| 4,165,487 | 8/1979 | Corderman | 455/41 |
| 4,264,790 | 4/1981 | Zlevor | 381/155 |
| 4,457,019 | 6/1984 | Szabo, Jr. et al. | 455/41 |
| 4,485,484 | 11/1984 | Flanagan | 381/92 |
| 4,551,028 | 11/1985 | Rowen et al. | 368/276 |
| 4,586,195 | 4/1986 | DeGeorge et al. | 381/92 |
| 4,682,155 | 7/1987 | Shirley | 340/522 |
| 4,768,023 | 8/1988 | Xie | 340/573 |

Primary Examiner—Reinhard J. Eisenzopf
Assistant Examiner—Lisa Charouel
Attorney, Agent, or Firm—Norman E. Lehrer

[57] ABSTRACT

A radio device designed to receive a broadcast of player or performer conversations and/or sounds at sporting or performance events but to be useless after the event; and a method of picking up player or performance conversations and/or sounds and transmitting them to purchasers of the devices.

9 Claims, 1 Drawing Sheet

SINGLE USE RADIO DEVICE AND METHOD FOR USING THE SAME

BACKGROUND OF THE INVENTION

The present invention is directed to a system for allowing selected individuals to receive a radio broadcast at an event such as a sporting event or other performance event.

Systems are in use in art galleries, zoos, live theater and the like wherein a broadcast to selected, usually prepaid, recipients, is accomplished by renting a receiving device to each recipient, usually requiring a security deposit or some other system to assure the return of the receiving device at the conclusion of the event or the rental period.

At sporting events, especially at professional football games, systems are in use to receive on-field conversations from the players and/or referees, and to broadcast said conversations as part of a regular, commercial television or radio broadcast of the event. For example, referees are sometimes equipped with portable radio transmitters which they can turn on to announce decisions on plays; and players are sometimes "eavesdropped" upon with a sensitive directional microphone pick-up device and their conversation may be broadcast as part of the normal television or radio broadcast of the game.

A disadvantage of the rentable, returnable receiver device's method is that it is a labor intensive process to assure that none of the devices are stolen and that all said devices are returned at the conclusion of the event.

A disadvantage of the broadcast of the eavesdrop player conversation as part of conventional television or radio programs is that such conversation is so interesting to spectators that they would be willing to pay to receive it and potential revenue is lost.

SUMMARY OF THE INVENTION

It is an object of the present invention to provide a radio device which can be sold, instead of rented, for one time use.

It is another object of the present invention to provide a low cost, single use device for receiving a special radio broadcast over a special frequency which is useless after the broadcast.

These objects, and others which will become apparent to the reader of the following detailed description, are achieved by the present invention which, in one aspect, comprises an apparatus comprising a single use, battery-operated device for receiving low power, special frequency radio signals which has no means for being turned off and no means for battery replacement. In another aspect the invention comprises a method of allowing certain spectators at a sporting event or other performance event to hear player or participant conversation and/or sounds by providing the spectators with such devices and using a sound pickup assembly comprised of a sensitive directional microphone to pick up player or other participant conversations and/or sounds on a playing field or performance area.

Appropriate portions of these conversations are transmitted over a special radio frequency signal at a power level selected to allow said signal to be received by said devices.

BRIEF DESCRIPTION OF THE DRAWINGS

For the purpose of illustrating the invention, there are shown in the accompanying drawings embodiments of the invention which is presently preferred; it being understood that the invention is not intended to be limited to the precise arrangements and instrumentalities shown.

DETAILED DESCRIPTION OF THE PREFERRED EMBODIMENT

Figure 1:
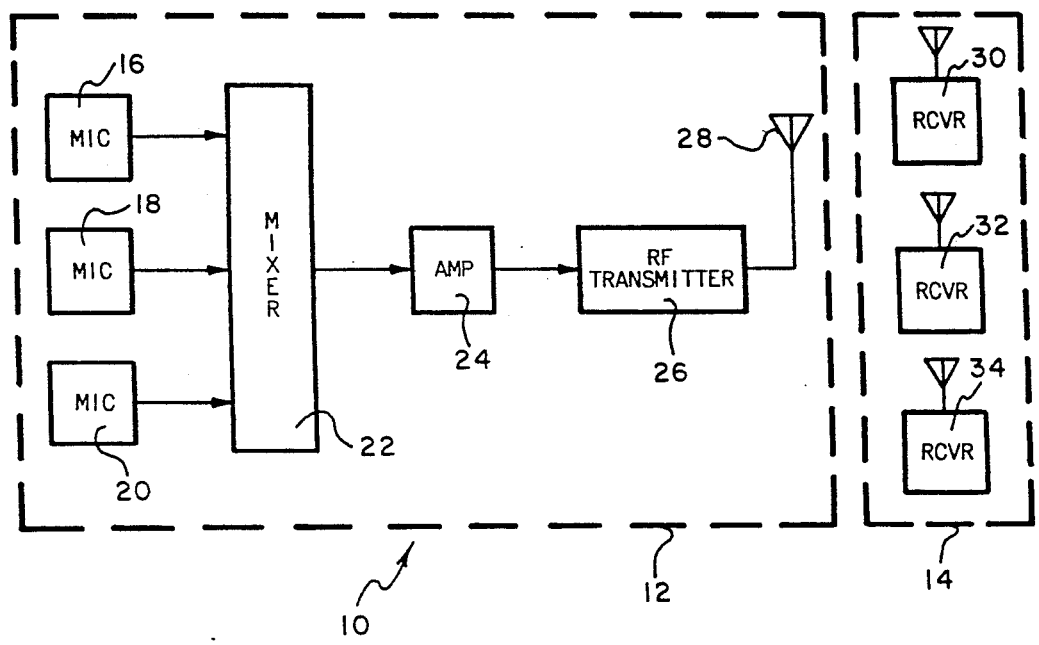
FIG. 1 is a schematic representation of a radio system in accordance with the invention.

Referring now to the drawing in detail wherein like reference numerals have been used throughout the various figures to designate like elements, there is shown in FIG. 1 a schematic representation of a radio system constructed in accordance with the principles of the present invention and designated generally as 10. System 10 is comprised essentially of two subsystems: a transmitting system 12 and a receiving system 14.

Transmitting subsystem 12 includes a plurality of microphones or other sound pickup devices such as shown at 16, 18 and 20. These microphones may be wireless mikes worn by one or more of the athletes, officials or coaches or the like or may be parabolic microphones or similar devices that can pick up conversations and other sounds from a distance. Such parabolic microphones may be located off the playing field but directed toward one or more players or the participants in the sporting event so as to pick up conversations. The wireless microphones and parabolic microphones useful with the present invention are well known in the art and, therefore, will not be described in detail herein. Furthermore, while the system is currently being described with three microphones 16, 18 and 20, it should be readily apparent that this is by way of example only and that substantially any number of microphones can be utilized.

The output from each of the microphones or other pickup devices are combined in an appropriate mixer circuit 22. Again, the mixer circuit 22 is of conventional design and will not be described in detail.

The output of mixer 22 is amplified by audio frequency amplifier 24 which, in turn, is connected to a radio frequency transmitter 26. A transmitting antenna 28 connected to the transmitter 26 transmits the sounds picked up by the microphones 16, 18 and 20 over radio frequency waves to certain spectators in the stadium or other area where the sporting or similar event is taking place.

The actual frequency at which the transmitter 26 will transmit the signals is preferably on either side of the standard FM band, i.e. on either side of 88 to 108 mhz. This is particularly desirable because components for the equipment (more specifically the receivers as will be explained more fully hereinafter) are more readily available and are, therefore, less expensive. The preferred frequency range is 49 to 88 mhz or 108 to 220 mhz but these may vary depending on costs, performance and/or FCC or other government agency requirements.

Because the transmission from the transmitter 26 is primarily line of sight, the power required is relatively low. Furthermore, power can be kept low even if a large or unusually shaped area must be covered by using multiple transmitters. The ideal power for transmitter 26 is 50 milliwatts since this makes it easier to meet FCC guide lines and cost and complexity are reduced. It must be understood, however, that the present invention can be practiced with higher power although special FCC approval would probably be required.

As pointed out above, the system 10 also includes a receiving subsystem 14. This subsystem 14 is comprised of a plurality of individual receivers such as shown at 30, 32 and 34. Again, while only three such receivers are shown, it should be understood that the system will work with substantially any number of receivers. Preferably, each spectator will purchase or will otherwise be provided with one of the receivers.

Each receiver is preferably a miniature FM receiver which is either pretuned to a specific frequency which, of course, is the frequency on which transmitter 26 is transmitting, or each receiver may be tunable to one or more frequencies. Each of these frequencies is preferably outside the band of any conventional broadcasting frequency. Preferably, each of the receivers is also provided with a small earphone or earplug so that only the owner of the receiver and not those fans or spectators around him can hear the broadcast being received by his receiver.

Figure 3:
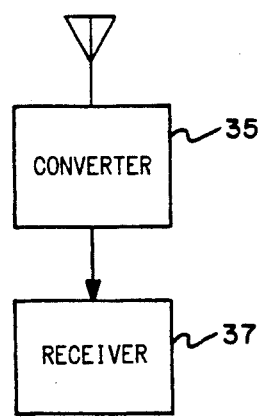
FIG. 3 is a schematic representation of a second embodiment of the receiving units useful with the invention.

Although each of the receivers 30-34 may be totally self contained in that it includes a radio frequency section, an audio section and an earplug or other transducer, it may also be possible to construct these receivers in the nature of converters. As shown in FIG. 3, each device could merely be an attachment or converter 35 attached to a standard radio receiver 37 which allows the standard receiver 37 to pick up the transmission from the transmitter 26. This may be done either by making the standard radio receiver 37 tunable to the otherwise untunable frequency through the use of converter 35 or by allowing the standard radio receiver to decipher or decode an otherwise encoded or hidden signal which is decoded by the converter. In other words, the converter 35 is capable of receiving a special frequency radio signal and converting it to an unassigned, regular frequency which can be received by the conventional portable radio receiver 37 without interference by a conventional station broadcast.

In the preferred embodiment of the invention, each receiver 30-34 is designed for single or one-time use only. It is contemplated that each receiver will be made as inexpensively as possible, making them affordable so that more fans or spectators will purchase the same. On the other hand, because of the inexpensive nature of the receiving device, it would not be desirable for the spectator to reuse the same either himself or by passing the device onto a friend for a subsequent event. The invention, therefore, contemplates the use of a battery which has a useful life of approximately 6 to 8 hours and which cannot be replaced. Means are provided so that the receiving device can be turned on by the user to thereby initiate the same but no means are provided for turning the device off. Nor are means provided for replacing the battery. Thus, once the battery dies, the receiving device is useless and must be disposed of.

Figure 2:
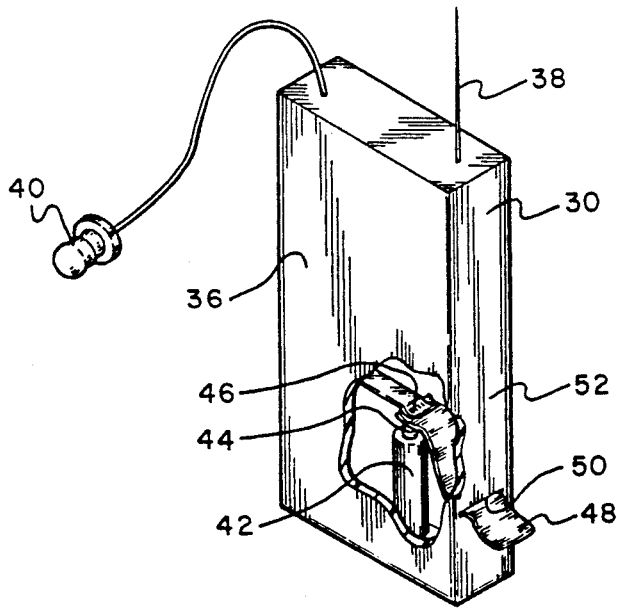
FIG. 2 is a perspective view, partially in cross section, of a receiver useful with the invention.

Referring now to FIG. 2 it can be seen that the receiver 30 is preferably contained in a housing 36 having an antenna 38 extending therefrom or built into the housing and an earphone or earplug 40 extending from the housing. The actual radio receiver circuitry within the housing 36 is well known in the art and will not, therefore, be described in detail.

When the receiver 30 is being manufactured, the battery 42 is inserted within the housing and the battery may either be potted therein and/or the housing may then be sealed closed so that it cannot be reopened without breaking the same.

When the battery is installed, however, at least one terminal of the battery such as terminal 44 is not in contact with the terminal 46 of the radio receiver circuitry. Rather, a thin, flexible dielectric material such as ribbon 48 lies between the terminals 44 and 46. This ribbon 48 extends outwardly through a narrow slot 50 in the side wall 52 of the housing 36. Preferably, this slot 50 is not located in direct alignment with the terminals 44 and 46 but is spaced above or below the same.

As should be readily apparent, in order to activate the radio receiver circuit, all that is necessary is for the user to pull on the ribbon 48 so as to remove the same from the housing. When this is done, the terminal 44 of the battery 42 contacts the terminal 46 of the radio receiver circuit and the same is activated. Neither the ribbon 48 nor any other article, however, can be inserted back through the very narrow slot 50 so as to deactivate the battery. The battery will, therefore, continue to operate the radio receiver until the battery is drained. At this time, the device has no use and must be discarded. If the spectator wishes to hear the selected broadcast from the next sporting event, he must purchase another receiving device.

The present invention may be embodied in other specific forms without departing from the spirit or essential attributes thereof and accordingly reference should be made to the appended claims rather than to the foregoing specification as indicating the scope of the invention.

We claim:

1. A disposable use apparatus comprising a housing, a battery and a battery-operated device for receiving low power, special frequency radio signals, said apparatus having no means for being turned off and no means for battery replacement or recharging, said battery being permanently sealed within said housing and having a short useful life of less than one day, wherein said device is a converter which is capable of receiving a special frequency radio signal and converting it to an unassigned, regular frequency which can be received by a conventional, portable radio receiver without interference by a conventional station broadcast.

2. A system comprising a disposable use device comprising a housing, a battery and a battery-operated device for receiving low power, special frequency radio signals, said device having no means for being turned off and no means for battery replacement or recharging, said battery being permanently sealed within said housing and having a short useful life of less than one day, said system further including a low power radio transmitter tuned or tunable to said special frequency and including at least one sound pickup assembly comprising a sensitive directional microphone.

3. Apparatus in accordance with claim 2 wherein said microphone is a parabolic microphone capable of picking up sounds from substantial distances.

4. A system comprising:
 (a) a disposable, battery-operated device, pretuned or tunable to a special frequency, capable of receiving low power, special frequency radio signals, having no means for being turned off and no means of battery replacement and wherein said battery has a short useful life of less than one day, said device being selected from the group consisting of (i) a converter which is capable of receiving a special frequency radio signal and converting it to an unassigned, regular frequency which can be received by a conventional, portable radio receiver without interference by a conventional station broadcast, and (ii) a radio receiver capable of receiving said special frequency radio signal, (b) at least one sound pickup assembly comprising a sensitive directional microphone, and (c) a low power radio transmitter tuned or tunable to said special frequency, and (d) means for feeding sound picked up by said sound pickup assembly to said transmitter.

5. Apparatus in accordance with claim 4 wherein said microphone is a parabolic microphone capable of picking up sounds from substantial distances.

6. Apparatus in accordance with claim 4 wherein said battery has a capacity to operate said device for no more than 6 to 8 hours from the time said device is turned on.

7. A method allowing certain spectators or attendees at a sporting event or other performance event to hear player/participant conversation or sounds at such sporting event or performance event comprising:

(a) providing said spectators/attendees with devices comprised of a disposable use apparatus comprising a housing, a battery and a battery-operated device for receiving low power, special frequency radio signals, said apparatus having no means for being turned off and no means for battery replacement or recharging, said battery being permanently sealed within said housing and having a short useful life of less than one day;

(b) using a sound pickup assembly comprised of a sensitive directional microphone to pick up player/participant conversation or sounds on a playing field or performance area, said microphone being located outside of said playing field or performance area;

(c) transmitting the appropriate portions of said conversation or sounds over a special frequency radio signal at a power level selected to allow said signal to be received by said devices.

8. The method as claimed in claim 7 wherein said device is a frequency converter capable of receiving a special frequency radio signal and converting it to an unassigned, regular frequency which can be received by a conventional, portable radio receiver used by said spectators and/or attendees without interference by a conventional station broadcast.

9. The method as claimed in claim 7 wherein said device is a radio receiver capable of receiving a special frequency radio signal.

* * * * *